(12) United States Patent
Morrison et al.

(10) Patent No.: US 7,547,163 B2
(45) Date of Patent: Jun. 16, 2009

(54) CLAMPING TOOL HOLDER

(75) Inventors: Michael G. Morrison, Tarrs, PA (US); Lance D. Brunetto, Greensburg, PA (US); Charles Lisle Conway, Ligonier, PA (US)

(73) Assignee: Kennametal Inc., Latrobe, PA (US)

( * ) Notice: Subject to any disclaimer, the term of this patent is extended or adjusted under 35 U.S.C. 154(b) by 21 days.

(21) Appl. No.: 11/879,189

(22) Filed: Jul. 16, 2007

(65) Prior Publication Data

US 2009/0022553 A1    Jan. 22, 2009

(51) Int. Cl.
 *B23B 27/16* (2006.01)
 *B23B 29/04* (2006.01)
(52) U.S. Cl. .................. 407/103; 407/105; 407/107
(58) Field of Classification Search ............ 407/103, 407/104, 105, 107, 100, 101, 102, 111
 See application file for complete search history.

(56) References Cited

U.S. PATENT DOCUMENTS

| | | | |
|---|---|---|---|
| 1,396,180 A | 11/1921 | Fors | |
| 2,808,638 A | 10/1957 | Filippi | |
| 2,982,008 A | 5/1961 | Facnitz | |
| 2,999,301 A | 9/1961 | Conti et al. | |
| 3,084,416 A | 4/1963 | Broughton | |
| 3,102,326 A | 9/1963 | Conti et al. | |
| 3,138,846 A | 6/1964 | Conti et al. | |
| 3,156,032 A | 11/1964 | Lundgren | |
| 3,243,864 A | 4/1966 | Yogus | |
| 3,316,616 A | 5/1967 | Milewski | |
| 3,371,567 A | 3/1968 | Davis | |
| 3,577,618 A * | 5/1971 | Cashman | ............. 407/104 |
| 3,731,356 A | 5/1973 | Gowanlock | |
| 3,837,058 A | 9/1974 | Barkley et al. | |
| 3,987,524 A | 10/1976 | Hochmuth et al. | |
| 3,997,951 A * | 12/1976 | Williscraft | ............. 407/105 |
| 4,226,560 A | 10/1980 | Kraemer | |
| 4,244,666 A | 1/1981 | Erickson et al. | |
| 4,247,231 A | 1/1981 | Kraemer | |
| 4,398,853 A | 8/1983 | Erickson | |
| 4,477,212 A | 10/1984 | Kraft | |
| 4,480,950 A | 11/1984 | Kraft et al. | |

(Continued)

FOREIGN PATENT DOCUMENTS

EP     0 398 363 B1    3/1994

(Continued)

*Primary Examiner*—Willmon Fridie
(74) *Attorney, Agent, or Firm*—Larry R. Meenan

(57) ABSTRACT

A clamping tool holder includes a tool holder body and a clamp for clamping a cutting insert. The clamp causes the cutting insert to press against the bottom and the side walls of an insert-receiving pocket of the tool holder body. The tool holder body has an inclined surface sloping inward in a direction away from the insert-receiving pocket. The clamp has an inclined surface that acts as a ramp with the inclined surface of the tool holder body. A guide pin prevents the clamp from twisting during tightening or loosening of the clamp. When a clamp screw is tightened, a nub of the clamp engages only an inside rearward surface of a mounting bore of the insert along a line of contact and the top surface of the cutting insert. In addition, only a forward lower face of a head portion of the clamp screw engages a top surface of the clamp.

18 Claims, 9 Drawing Sheets

U.S. PATENT DOCUMENTS

| | | | |
|---|---|---|---|
| 4,600,341 A * | 7/1986 | Board | 407/99 |
| 4,697,963 A | 10/1987 | Lueck | |
| 5,035,544 A * | 7/1991 | Ikenaga et al. | 407/105 |
| 5,100,268 A * | 3/1992 | Nakayama et al. | 407/104 |
| 5,442,981 A | 8/1995 | Vegh | |
| 5,536,120 A | 7/1996 | Miller | |
| 5,586,844 A | 12/1996 | Nyman | |
| 5,685,672 A * | 11/1997 | Tjernstrom | 407/104 |
| 5,820,311 A * | 10/1998 | Grun et al. | 407/102 |
| 5,944,457 A * | 8/1999 | Tjernstrom | 407/105 |
| 6,176,649 B1 | 1/2001 | Friedman | |
| 6,394,709 B1 * | 5/2002 | Sjoo et al. | 407/2 |
| 6,409,435 B1 | 6/2002 | Kocherovsky et al. | |
| 6,457,914 B1 * | 10/2002 | Andras et al. | 407/105 |
| 6,609,859 B1 | 8/2003 | Sjoeoe | |
| 6,682,273 B2 * | 1/2004 | Sjoo et al. | 407/105 |
| 6,969,218 B2 | 11/2005 | Lach et al. | |
| 7,261,496 B2 * | 8/2007 | Zitzlaff | 407/107 |
| 2006/0018723 A1 | 1/2006 | Sjoo et al. | |

FOREIGN PATENT DOCUMENTS

| | | |
|---|---|---|
| EP | 0 759 826 B1 | 7/2002 |
| JP | 51-81086 | 7/1976 |
| JP | 60-114403 A | 6/1985 |
| JP | 3-92206 | 4/1991 |
| WO | 95/32829 A1 | 12/1995 |
| WO | 99/30860 A1 | 6/1999 |
| WO | 02/16066 A1 | 2/2002 |

* cited by examiner

CLAMPING TOOL HOLDER

FIELD OF THE INVENTION

The present invention pertains to a clamping tool holder. More particularly, the present invention relates to a clamping tool holder for releasably securing an insert to the toolholder.

BACKGROUND OF THE INVENTION

Typically, tool holder mechanisms utilize a conical bore whose axis is offset from the threaded section of the locking pin receiving hole to tilt the locking pin into abutment with the cutting insert. These designs are difficult to machine because the location of the conical bore must be maintained within a relatively tight tolerance if it is to achieve the desired tilting of the locking pin. Therefore, there is a need to provide a tool holder for clamping an insert that is simple to manufacture and has improved manufacturing tolerances.

An example of a clamping toolholder is shown in U.S. Pat. No. 6,457,914, incorporated herein by reference.

SUMMARY OF THE INVENTION

In one aspect of the invention, a tool holder for releasably clamping an insert within a tool holder body comprises a tool holder body including an insert-receiving pocket formed at a forward end thereof and having a bottom and at least one side wall for receiving the insert. The bottom of the insert-receiving pocket has a mounting bore. The tool holder body further includes a clamp-securing bore having a central axis forming an angle with respect to a plane of the tool holder body. A clamp is arranged on the tool holder body. The clamp includes a nose portion with a downward extending nub having a central axis forming an angle with respect to the plane of the tool holder body. The clamp includes a top surface, a forward lower face and a rearward lower face, and an aperture formed therethrough. A clamp screw is capable of being inserted through the aperture of the clamp and at least partially received in the clamp-securing bore of the tool holder body to bring the clamp into pressing engagement with the insert, wherein only the nub of the nose portion of the clamp engages a rearward inside surface of the mounting bore of the insert, and wherein only the forward lower face of the nose portion engages a top surface of the insert when the clamp is brought into pressing engagement with the insert.

In another aspect of the invention, a tool holder for releasably securing an insert comprises a tool holder body including an insert-receiving pocket formed at a forward end thereof. The tool holder body further includes a clamp-securing bore having a central axis forming an angle with respect to a plane of the tool holder body, and a pin-receiving bore having a central axis formed at an angle with respect to the plane of the tool holder body. A clamp is arranged on the tool holder body. The clamp includes a nose portion with a downward extending nub having a central axis forming an angle with respect to the plane of the tool holder body. The clamp includes a top surface, a forward lower face and a rearward lower face, and an aperture formed therethrough. A clamp screw is capable of being inserted through the aperture of the clamp and at least partially received in the clamp-securing bore of the tool holder body to bring the clamp into pressing engagement with the insert. The clamp screw includes a head portion having a lower face, wherein only the nub of the nose portion of the clamp engages a rearward inside surface of the mounting bore of the insert, and wherein only the forward lower face of the nose portion engages a top surface of the insert when the clamp is brought into pressing engagement with the insert, and wherein only a forward end of the lower face of the head portion of the clamp screw engages the top surface of the clamp when the clamp is brought into pressing engagement with the insert.

In another aspect of the invention, a method of clamping an insert to a tool body, comprises the steps of:

providing a tool holder body including an insert-receiving pocket formed at a forward end thereof and having a bottom and at least one side wall for receiving the insert, the bottom of the insert-receiving pocket having a mounting bore, the tool holder body further including a clamp-securing bore having a central axis forming an angle with respect to a plane of the tool holder body;

providing a clamp arranged on the tool holder body, the clamp including a nose portion with a downward extending nub having a central axis forming an angle with respect to the plane of the tool holder body, the clamp including a top surface, a forward lower face and a rearward lower face, and an aperture formed therethrough; and inserting a clamp screw into the aperture of the clamp and at least partially received in the clamp-securing bore of the tool holder body to bring the clamp into pressing engagement with the insert, whereby only the nub of the nose portion of the clamp engages a rearward inside surface of the mounting bore of the insert, and whereby only the forward lower face of the nose portion engages a top surface of the insert when the clamp is brought into pressing engagement with the insert.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
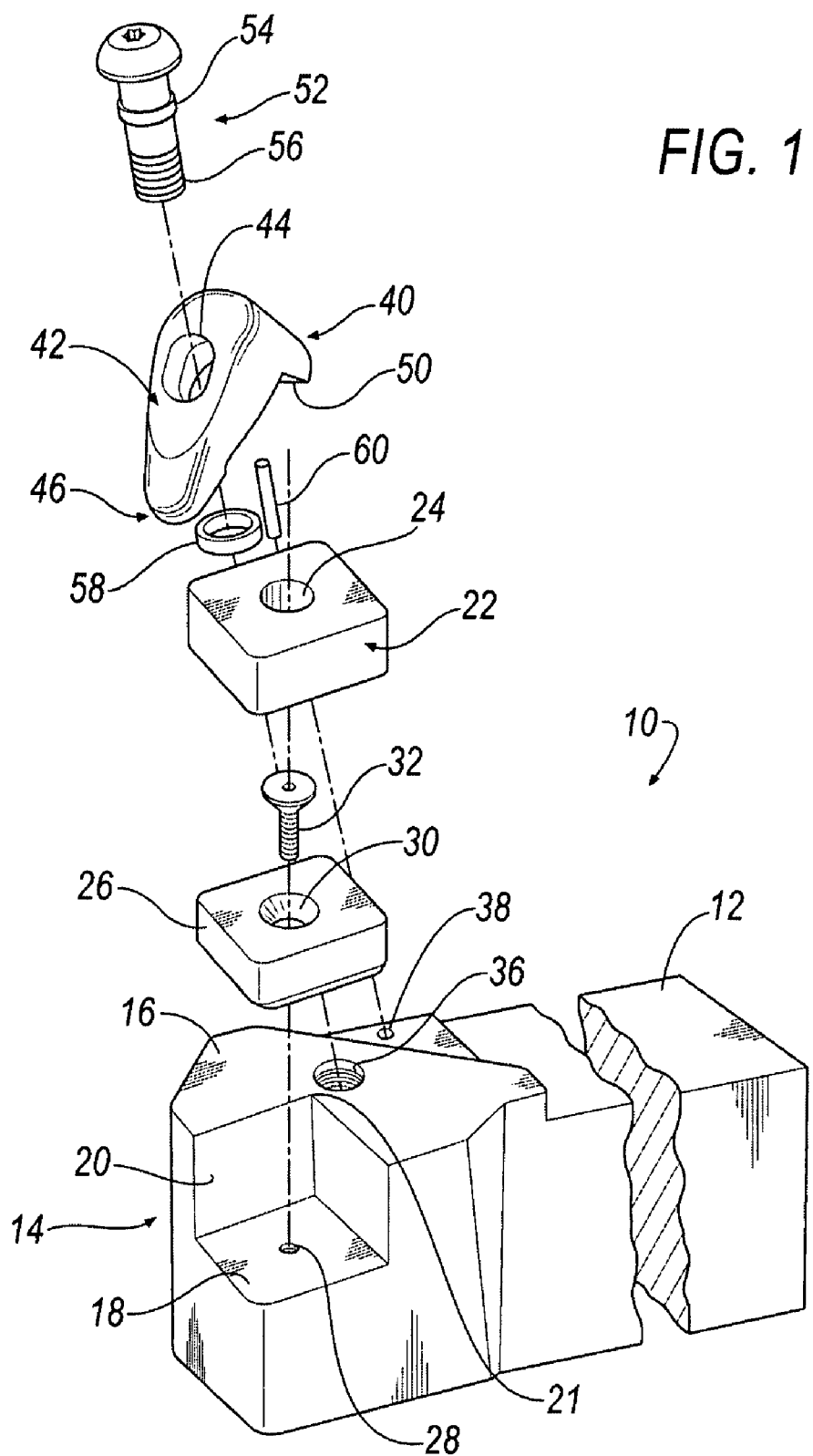
FIG. 1 is an exploded side perspective view of a clamping tool holder in accordance with an embodiment of the invention.
Figure 2:
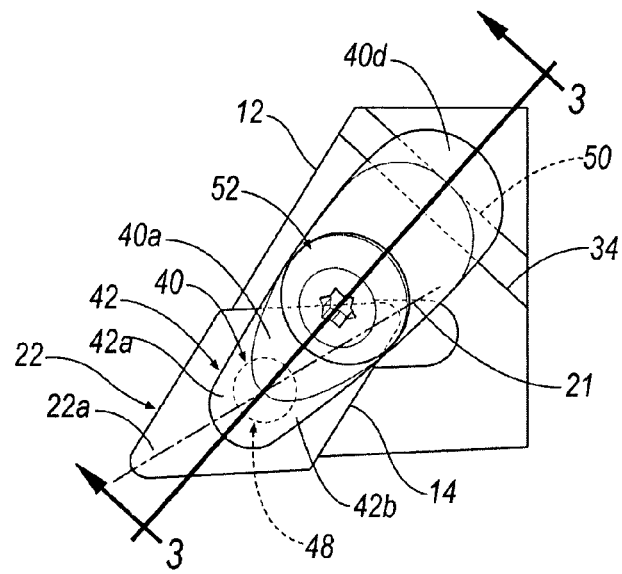
FIG. 2 is a top view of the clamping tool holder in an unclamped position in accordance with an embodiment of the invention.

Referring now to FIGS. 1-9, a clamping tool holder 10 is shown according to an embodiment of the invention. The clamping tool holder 10 comprises a tool holder body 12 having an insert-receiving pocket 14 formed in its upper surface 16 at a corner of its forward end portion. The insert receiving pocket 14 has a bottom 18 and angularly-disposed side walls 20 forming an apex 21 at the intersection between the side walls 20. An insert 22 having a mounting bore 24 formed therethrough is disposed on the bottom 18 of the pocket 14 with a seat member 26 therebetween. Although the insert 22 can be any shape, the illustrated insert 22 is generally diamond in shape having a top surface 22a (FIG. 2). An internally threaded bore 28 is formed in the bottom 18 of the pocket 14, and a bore 30 having an upper portion tapering downward is formed through the seat member 26. The seat member 26 is fixedly secured to the insert-receiving pocket 14 by means of a countersunk screw 32 inserted through the bore 30 and screwed into the threaded bore 28. In an alternative embodiment, the insert 22 can be disposed on the bottom 18 of the pocket 14 without the use of the seat member 26 and the head screw 32. In this alternative embodiment, it is not necessary to include the threaded bore 28 in the tool holder body 12.

Figure 3:
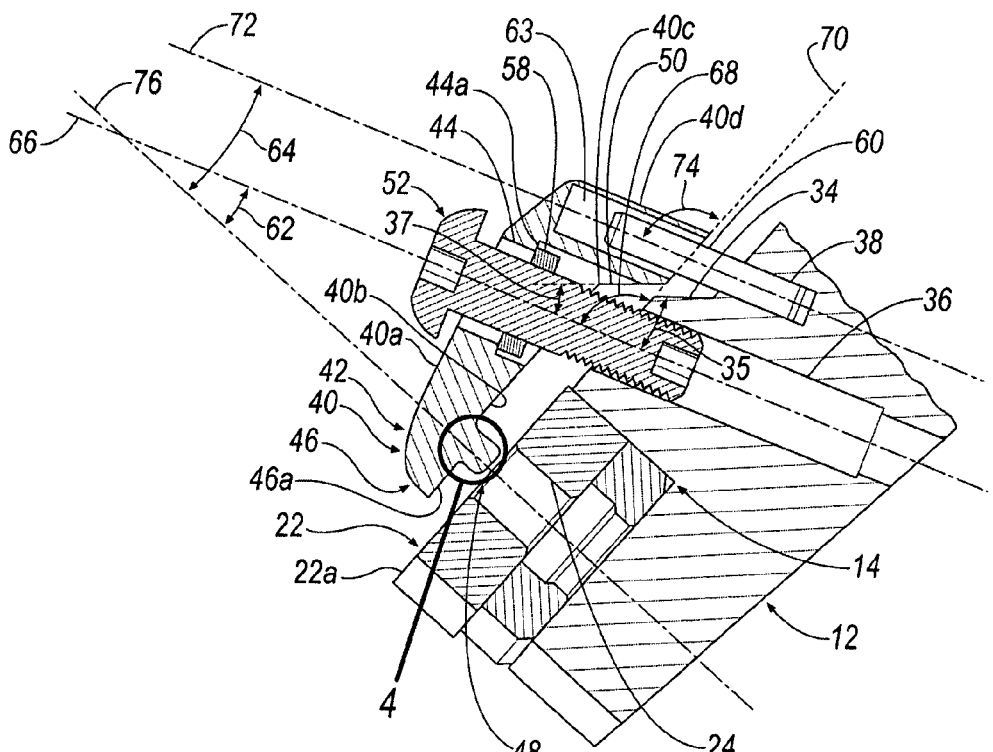
FIG. 3 is a partial cutaway cross-sectional view of the clamping tool holder in an unclamped position taken along line 3-3 of FIG. 2.

As seen in FIG. 3, an inclined surface 34 sloping inwardly in a direction away from the insert-receiving pocket 14 is formed on that portion of the upper surface 16 of the tool body 12 that is displaced rearwardly of the tool body 12 with respect to the pocket 14. An internally threaded clamp-securing bore 36 is formed in the tool holder 10 and is located between the inclined surface 34 and the insert-receiving pocket 14. The inclined surface 34 is formed at a prescribed angle 35 with respect to a central axis 66 of the clamp-securing bore 36. In an embodiment, the angle 35 is about 24 degrees. In this embodiment, the central axis 66 of the clamp-securing bore 36 forms an angle 68 that is not perpendicular to a plane 70 formed by the upper surface 16 of the body 12, as shown in FIG. 3.

The tool holder 10 further includes a pin-receiving bore 38 formed in the body 12 of the tool holder 10. The pin-receiving bore 38 maintains alignment of the clamp 40 and the tool body 12 as the clamp 40 presses downward and rearward on the insert 22. In the illustrated embodiment, the inclined surface 34 is located between a pin-receiving bore 38 and the clamp-securing bore 36. Alternatively, the pin-receiving bore 38 can be located between the inclined surface 34 and the clamp-securing bore 36. In this embodiment, a central axis 72 of the pin-receiving bore 38 is substantially parallel with the central axis 66 of the clamp-securing bore 36. Thus, the central axis 72 of the pin-receiving bore 38 forms an angle 68 that is not perpendicular to a plane 70 of the body 12, as shown in FIG. 3.

Figure 6:
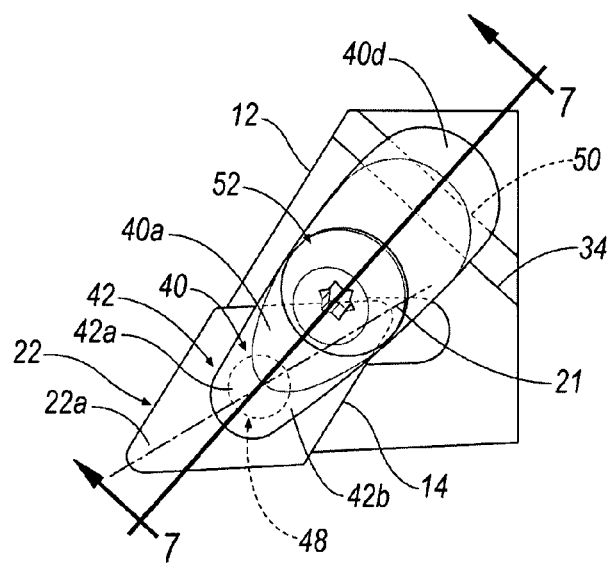
FIG. 6 is a top view of the clamping tool holder in the clamped position in accordance with an embodiment of the invention.
Figure 7:
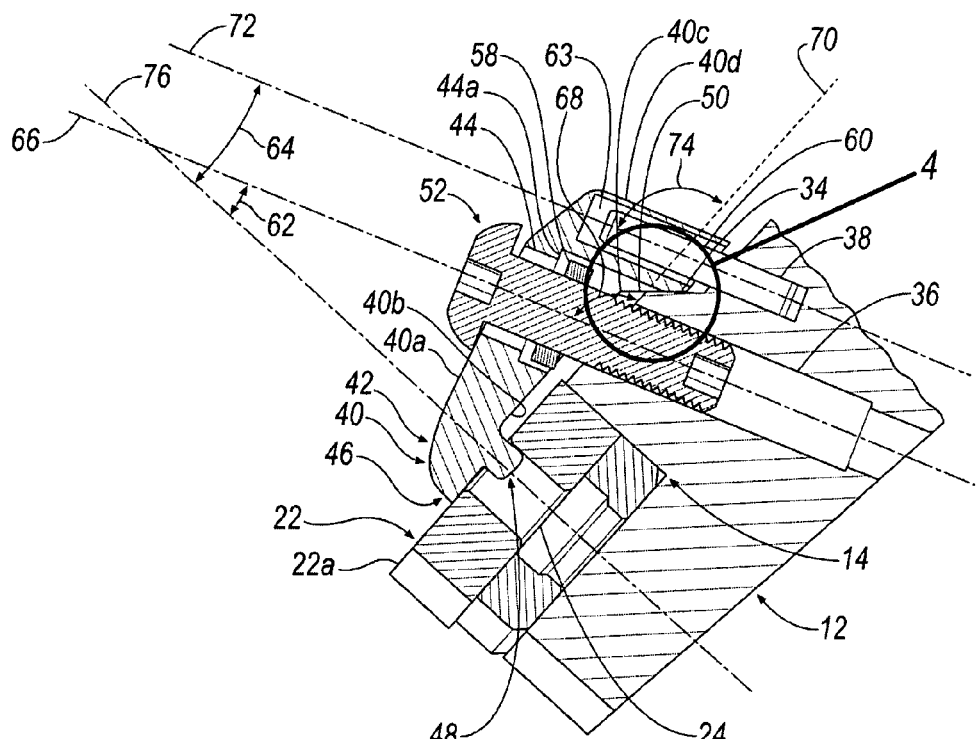
FIG. 7 is a partial cutaway cross-sectional view of the clamping tool holder in the clamped position taken along line 7-7 of FIG. 6.
Figure 8:
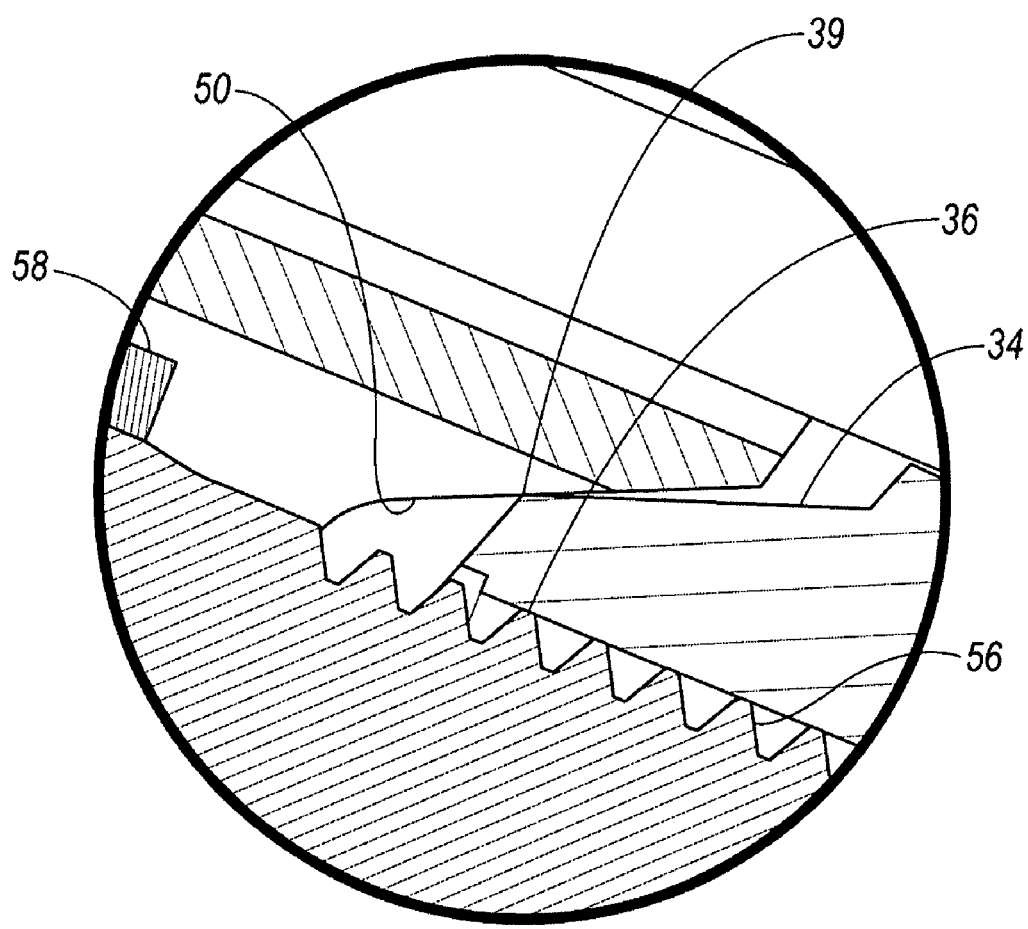
FIG. 8 is an enlarged view of the inclined surfaces at different angles that act as a ramp and create a pivot point when the clamping tool holder is in the clamped position.

A clamp 40 is arranged on the upper surface 16 of the tool holder body 12. As shown in FIGS. 1, 6 and 7, the clamp 40 is of a generally C-shape in side elevation having a tapered forward portion 42 and tapered side portions 42a, 42b to provide a low profile design. The low profile design facilitates the removal of chips during the cutting process. Formed in the center of the clamp 40 is a non-circular or oblong-shaped aperture 44 having a greater dimension along its longitudinal axis. The non-circular aperture 44 allows for some movement of the clamp 40 along its longitudinal axis, but does not allow as much movement perpendicular to the longitudinal axis of the clamp 40. As shown in FIG. 1, the aperture 44 is formed so that its central axis is substantially concentric with the central axis 66 of the clamp-securing bore 36 of the tool body 12. The clamp 40 also includes a top surface portion 40a, a substantially planar forward lower face 40b and a substantially planar rearward lower face 40c, as shown in FIG. 3.

As seen in FIG. 3, the forward end of the clamp 40 includes an arcuately-shaped nose portion 46 having a lower face 46a to be held in engagement with the top surface 22a of the insert 22. The forward lower face 46a of the nose portion 46 assist in distributing the downward and rearward force of the clamp 40 over the top surface 22a of the insert 22. The forward lower face 40b of the clamp 40 is formed so as to be positioned higher in elevation than the forward lower face 46a of the nose portion 46 so as to not engage the insert 22 when the forward lower face 46a of the nose portion 46 engages the top surface 22a of the insert 22, as shown in FIGS. 6 and 7.

The clamp 40 has an inclined surface 50 formed at a proximal end thereof so as to protrude downward and rearward with respect to the clamp-receiving bore 36. The inclined surfaces 34, 50 act as ramp surfaces when the tool holder 10 is moved from an unclamped position to a clamped position, and vice versa. However, the inclined surface 50 is formed at an angle 37 with respect to the central axis 66 of the clamp-receiving bore 36 that is slightly different than the angle 35 of the inclined surface 34 of the tool holder 10. In an embodiment, the angle 37 is about 24 degrees. As seen in FIG. 3, this difference between the angles 35, 37 causes the clamp 40 to pivot about a pivot point 39 (FIGS. 8 and 9) when the tool holder 10 is moved from the unclamped position to the clamped position. In the illustrated embodiment, the pivot point 39 is located at the intersection between the upper surface 16 and the inclined surface 34 of the tool holder 10. This pivoting action of the clamp 40 causes the clamp 40 to further exert a force downward and rearward when bringing the clamp 40 into pressing engagement with the insert 22, thereby enhancing the "pull back" feature of the invention.

It should be noted that the relative angle between the clamp-securing bore 36 and the inclined surfaces 34, 50 can be "tuned" to provide a desired downward force and/or rearward force on the insert 22. In one embodiment, the angle of the clamp-securing bore 36 of the inclined surfaces 34, 50 are approximately 24 degrees with respect to the central axis 66 of the clamp-receiving bore 36 to provide slightly more downward force than rearward force on the insert 22. However, it will be appreciated that the relative angle between the clamp-securing bore 36 and the inclined surfaces 34, 50 may be any desired angle to provide the desired ratio of downward to rearward force on the insert 22.

Figure 4:
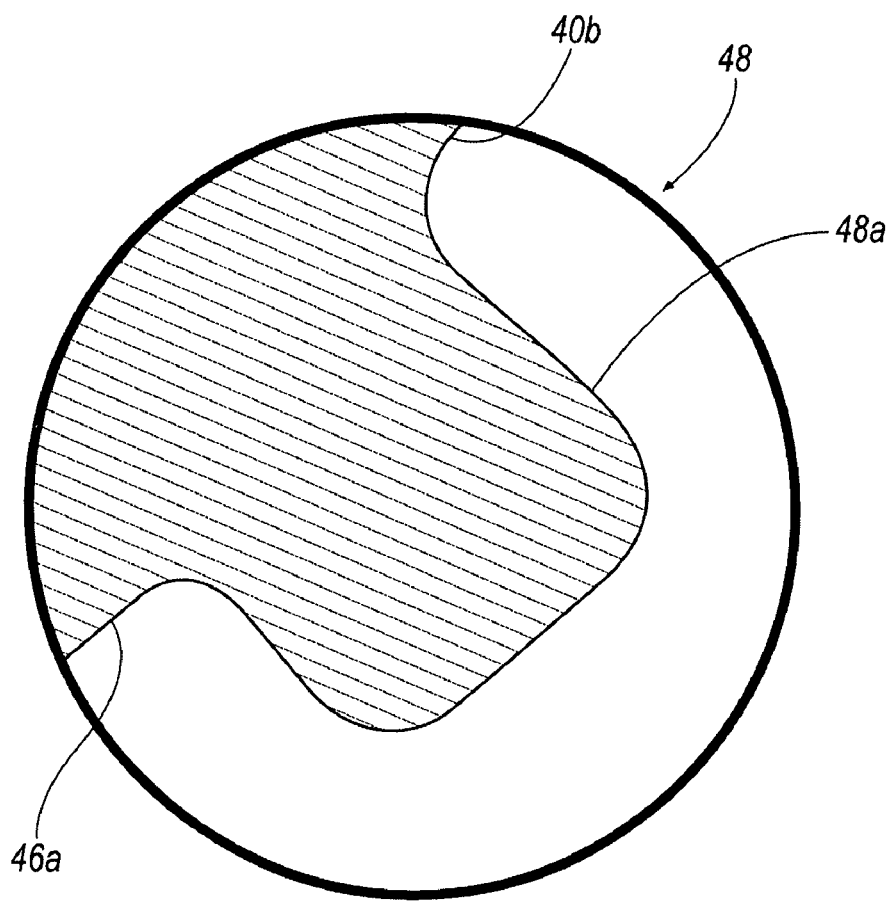
FIG. 4 is an enlarged cross-sectional view of the nub of the nose portion of the clamp in accordance with an embodiment of the invention.

Referring now to FIGS. 3 and 4, the clamp 40 includes a downward extending nub 48 that engages the mounting bore 24 of the insert 22 when the tool holder 10 is brought into the clamped position. In this embodiment, a central axis 76 of the nub 48 is substantially perpendicular to the forward lower face 40b of the clamp 40, as shown in FIGS. 3 and 7. The central axes 66, 72 of the clamp-securing bore 36 and the pin-receiving bore 38 are at angle 62, 64 with respect to the central axis 76 of the nub 48. In an embodiment, the angles 62, 64 are approximately 20 degrees that causes the nub 48 to engage the rearward inner surface of the mounting bore 24 along a flat surface that defines a line or surface area of contact 48a of the nub 48 and exert a force downward and rearward on the insert 22. This downward and rearward force may or may not be in alignment with the apex 21 of the pocket 14. In one embodiment, the flat surface that defines the line or surface area of contact 48a may be about 0.010 inches (0.254 mm).

The clamp 40 also includes a pin-receiving slot 63 positioned between the inclined surface 50 and a rear surface 40d of the clamp 40. As shown in FIGS. 3 and 7, the pin-receiving slot 63 of the clamp 40 is formed so that its axis is substantially concentric with the axis of the pin-receiving bore 38 of the body 12 of the tool holder 10. The pin-receiving slot 63 may be non-circular or oblong-shaped having a greater dimension along its longitudinal axis. The non-circular pin-receiving slot 63 allows for some movement along its longitudinal axis, but does not allow as much movement perpendicular to the longitudinal axis. A guide pin 60 is disposed within the pin-receiving bore 38 and the pin-receiving slot 63 to prevent the clamp 40 from spinning or twisting in a radial direction (in a direction perpendicular to the direction of travel of the clamp screw 52) when turning of the clamp screw 52 to loosen or tighten the clamp 40. Although the guide pin 60 can be formed of a solid pin, the guide pin 60 is preferably formed of a slotted spring pin that can flex, expand or compress to allow for variations in design and wear of the tool holder 10. Specifically, the slotted spring pin 60 can flex to maintain the relative positions of the aperture 44, the bore 36, the pin-receiving bore 38 of the tool body 12 and the pin-receiving slot 63 of the clamp 40 to compensate for changes in the relative angle of the central axes 76, 66, 72 of the bores 24, 36, 38, respectively, that may result due to manufacturing tolerances and wear of the tool body 12 and the clamp 40 (i.e., alignment creep). The guide pin 60 can be press fit into the pin-receiving bore 38 of the tool holder body 12. The length of the guide pin 60 is selected to allow the clamp 40 to move away from the insert 22 while preventing the clamp 40 from spinning or twisting in the radial direction.

It will be appreciated that the smaller width of the pin-receiving slot 63 can be slightly larger than the diameter of the guide pin 60 to allow free movement of the guide pin 60 within the pin-receiving slot 63. It will be appreciated that the pin-receiving slot 63 and guide pin 60 can be eliminated by forming the inclined surfaces 34, 50 with convex, concave or contour complementary shaped surfaces. Oppositely, the inclined surfaces 34, 50 can be eliminated and made integral with the guide pin 60 or attached as a separate component when retrofitting a conventional tool holder.

Figure 5:
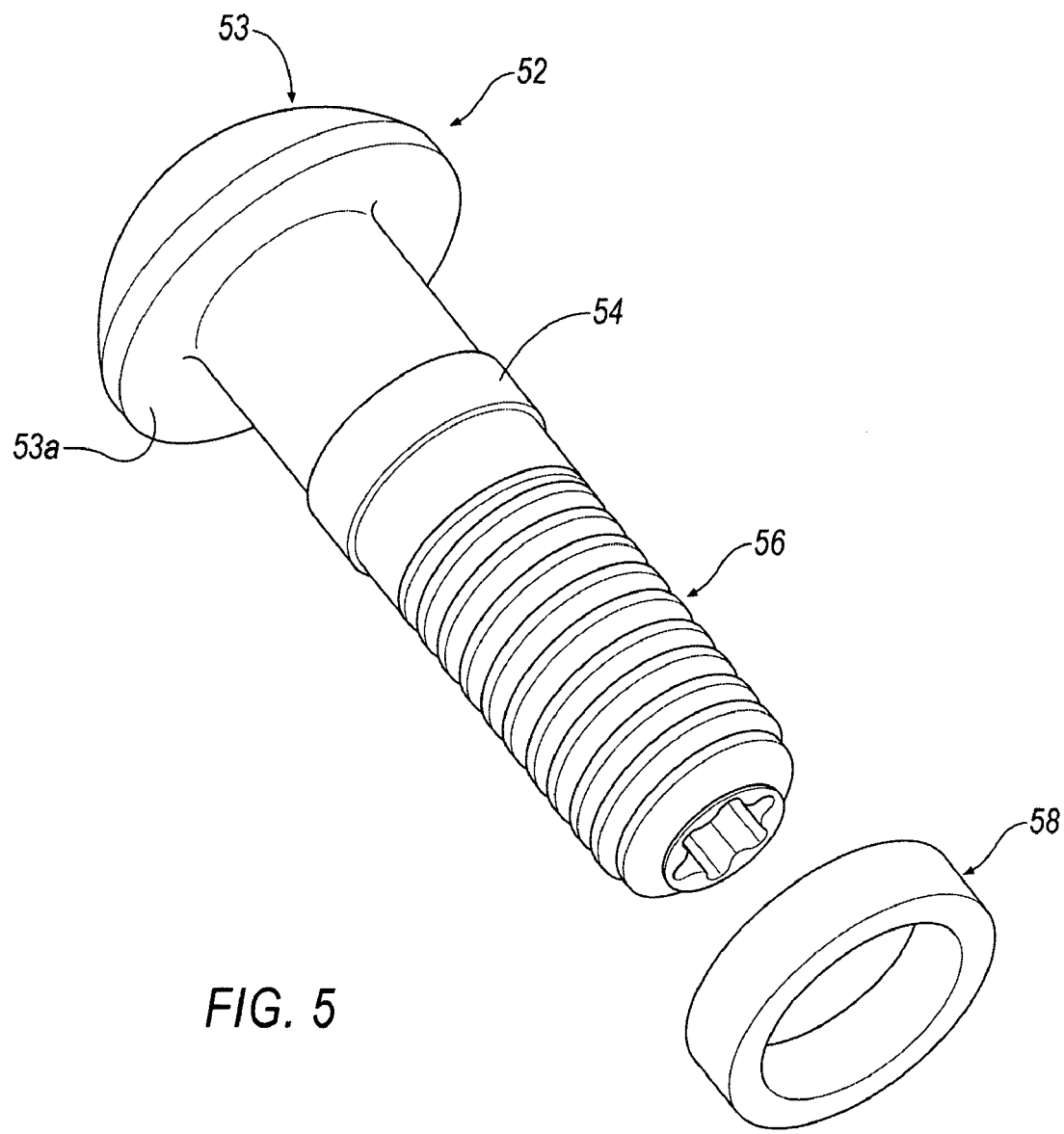
FIG. 5 is an exploded perspective view of the clamp screw and ring in accordance with an embodiment of the invention.
Figure 9:
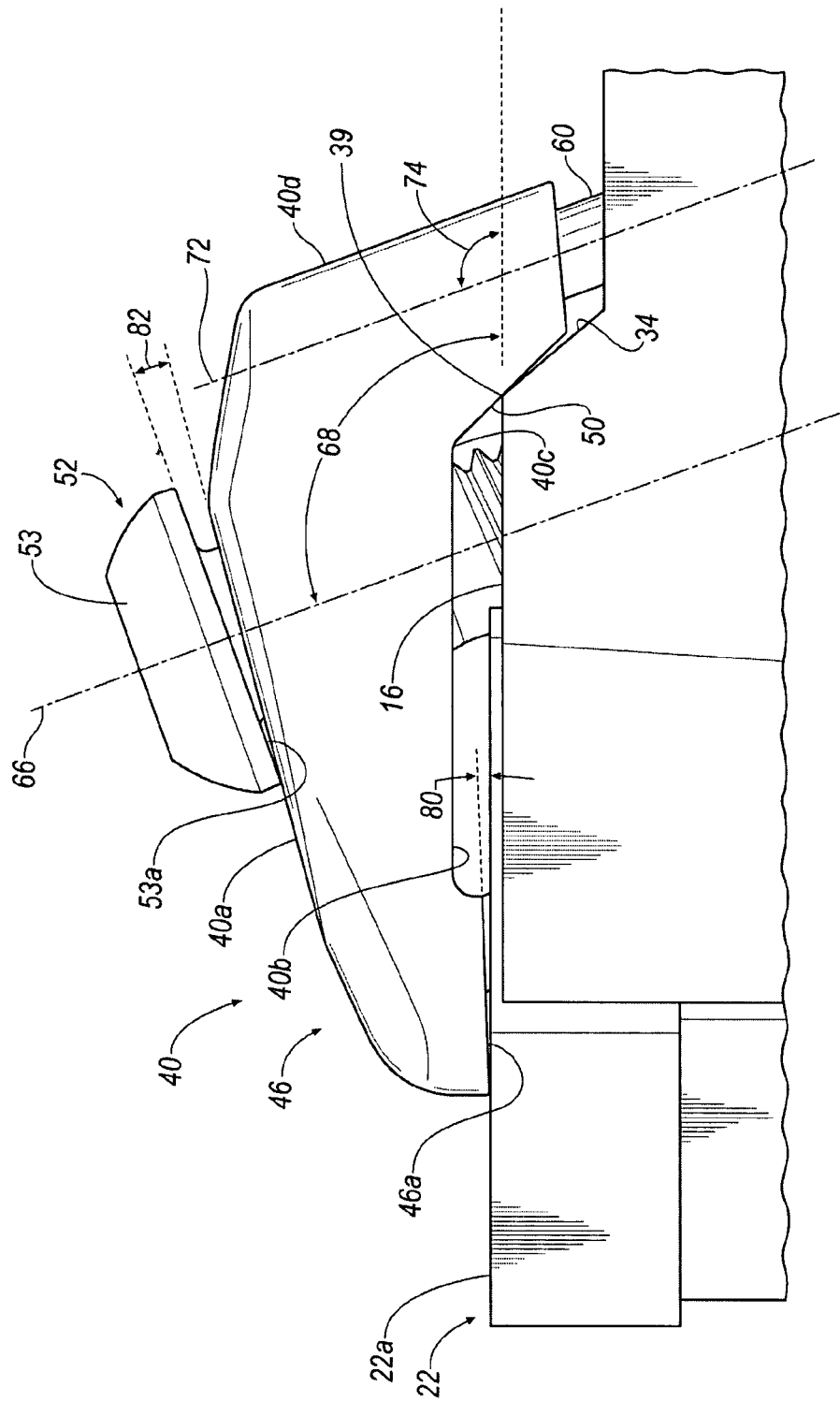
FIG. 9 is an enlarged partial side view of the clamping tool holder in the clamped position in accordance with the invention.

Referring now to FIGS. 3 and 5, the clamp 40 is secured to the tool holder body 12 by means of a clamp screw 52 having a head portion 53, a shoulder 54 and a threaded portion 56. The head portion 53 includes a lower face 53a that is substantially perpendicular to the central axis 66 of the clamp-receiving bore 36, as shown in FIG. 9. However, the top surface 40a of the clamp 40 forms an angle with respect to the lower face 53a when the tool holder 10 is placed in the clamped position. As a result, only the front portion of the lower face 53a engages the top surface 40a of the clamp 40 when the tool holder 10 is brought into the clamped position, as shown in FIG. 9.

During assembly of the tool holder 10, the threaded portion 56 is inserted through the aperture 44 and screwed into the threaded clamp-securing bore 36. It will be appreciated that the threads of the bore 36 may be slightly larger than the threads of the clamp screw 52 to allow for variations in design, i.e. manufacturing tolerances in the tool holder 10.

Figure 10:
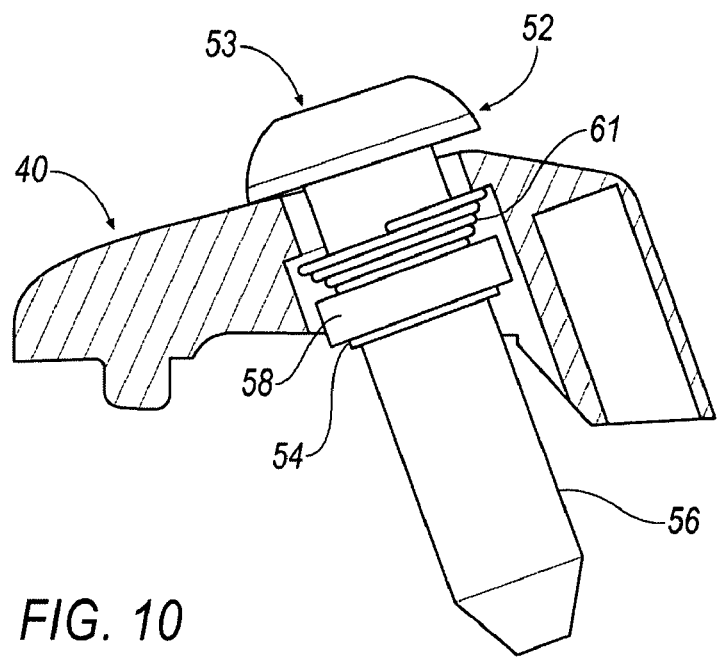
FIG. 10 is a side view of a clamp, a clamp screw, a ring and a tapered spring for biasing the clamp in accordance with an alternate embodiment of the invention.

In one embodiment, a ring 58 is press-fit to the shoulder 54 to assist in lifting the clamp 40 when the tool holder 10 is moved from the clamped position to the unclamped position, as seen in FIGS. 3 and 5. In another embodiment shown in FIG. 10, the ring 58 is used in combination with a tapered spring 61 that provides a biasing force to cause the clamp 40 to lift from the body 12 when the clamp screw 52 is rotated in a counter clockwise direction.

Figure 11:
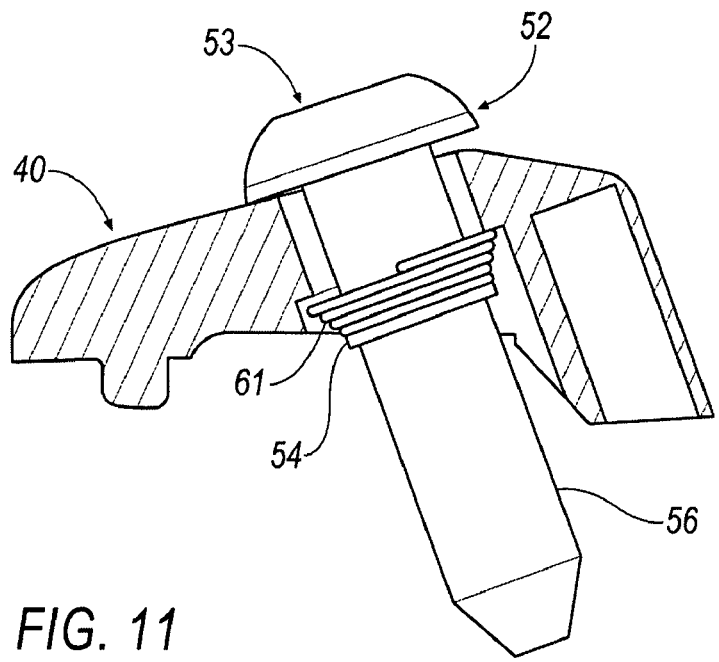
FIG. 11 is a side view of a clamp, a clamp screw and a tapered spring for biasing the clamp in accordance with an alternate embodiment of the invention.

However, the ring 58 is not necessary for lifting the clamp 40 from the tool holder 10. In another embodiment shown in FIG. 11, the ring 58 is omitted and only the tapered spring 61 is used to assist in lifting the clamp 40. In this embodiment, the bottom of the tapered spring 61 abuts the shoulder 54 of the clamp screw 52. It will be appreciated that the invention is not limited by the use of a tapered spring, and that the invention can be practiced using any means for providing a biasing force to assist in lifting the clamp when the tool holder 10 is moved from the clamped position to the unclamped position.

With reference to FIGS. 6-9, the clamping operation of the tool holder 10 using the clamp 40 will now be described. Usually, since the clamping operation is required only when replacing the cutting insert with a new one, it is normally not necessary to move the clamp 40 upward from the clamped position shown in FIG. 7 to the unclamped position shown in FIG. 3. Therefore, there may be provided a stop member (not shown) to prevent the clamp screw 52 from being further loosened from the state shown in FIG. 3.

From the unclamped position shown in FIG. 3, the clamp screw 52 is rotated in a clockwise direction to screw the clamp screw 52 into the clamp-securing bore 36 and cause the clamp 40 to move downward and rearward with respect to the insert 22. The clamp 40 is guided by guide pin 60 as it moves downward and rearward along the axis of the pin-receiving bore 38 of the body 12 of the tool holder 10. It should be noted that the nub 48 of the clamp 40 moves in a direction that may or may not be in alignment with the apex 21 of the pocket 14.

As the clamp 40 is further tightened by turning the clamp screw 52, the line of contact 48a of the nub 48 positively engages the rear inner surface of the mounting bore 24 of the insert 22. In addition, only the forward lower face 46a of the nose portion 46 engages the top surface 22a of the insert 22 when in the clamped position. As the clamp 40 is further tightened, the lower face 53a of the clamp screw 52 engages the top surface 40a of the clamp 40, further causing the forward lower face 46a of the clamp 40 to press against the top surface 22a of the insert 22. Further, the inclined surfaces 34, 50 act as a ramp about the pivot point 39 to further cause the clamp 40 to press the insert 22 downward and rearward to further secure the insert 22 to the pocket 14.

As shown in FIG. 4, one aspect of the invention is that only the line of contact 48a of the nub 48 contacts the inner surface of the mounting bore 24 when the clamp 40 is brought into pressing engagement with the insert 22. As shown in FIG. 9, another aspect of the invention is that only the forward lower face 46a of the nose portion 46 of the clamp 40 contacts the top surface 22a of the insert 22 when the clamp 40 is brought into pressing engagement with the insert 22. In other words, the forward lower face 46a forms an angle 80 with respect to the top surface 22a of the insert 22 when the clamp 40 is brought into pressing engagement with the insert 22. Another aspect of the invention is that the forward lower face 40b of the clamp 40 does not engage the insert 22 when the clamp 40 is brought into pressing engagement with the insert 22 because the forward lower face 40b is formed at a higher elevation than the forward lower face 46a of the nose portion 46. Yet another aspect of the invention is that only the forward lower face 53a of the clamp screw 52 engages the top surface 40a of the clamp 40 to further bring the nub 48 and the forward lower end 46a into pressing engagement with the insert 22. In other words, the forward lower face 53a forms an angle 82 with respect to the top surface 40a of the clamp 40 when the clamp 40 is brought into pressing engagement with the insert 22. Still yet another aspect of the invention is that the inclined surfaces 34, 50 are formed at different angles with respect to the central axis 66 of the bore 36, thereby causing the clamp 40 to pivot about the pivot point 39 to further bring the nub 48 and the forward lower face 46a into pressing engagement with the insert 22.

It will be appreciated that the invention is not limited by the type and shape of the insert 22, and that the invention can be practiced with any desirable shape and type of insert. For example, when the insert 22 is triangular in shape, rather than square or rectangular, the receiving pocket 14 can also be triangular in shape to accommodate the shape of the insert 22.

When removing the insert 22 from the tool holder body 12, the clamp screw 52 is turned in a counter clockwise direction to cause the ring 58 to engage a ledge 44a of the clamp 40 to assist in lifting the clamp 40, as shown in FIG. 3. As the clamp screw 52 is further turned, the inclined surface 50 is separated from the inclined surface 34, as shown in FIG. 3. In this released condition, the nose portion 46 of the clamp 40 is positioned above the insert 22 such that the insert 22 can be easily removed and replaced by a new insert 22. Accordingly, the clamp 40 is released such that replacing operation for the insert 22 can be conducted efficiently.

Figure 12:
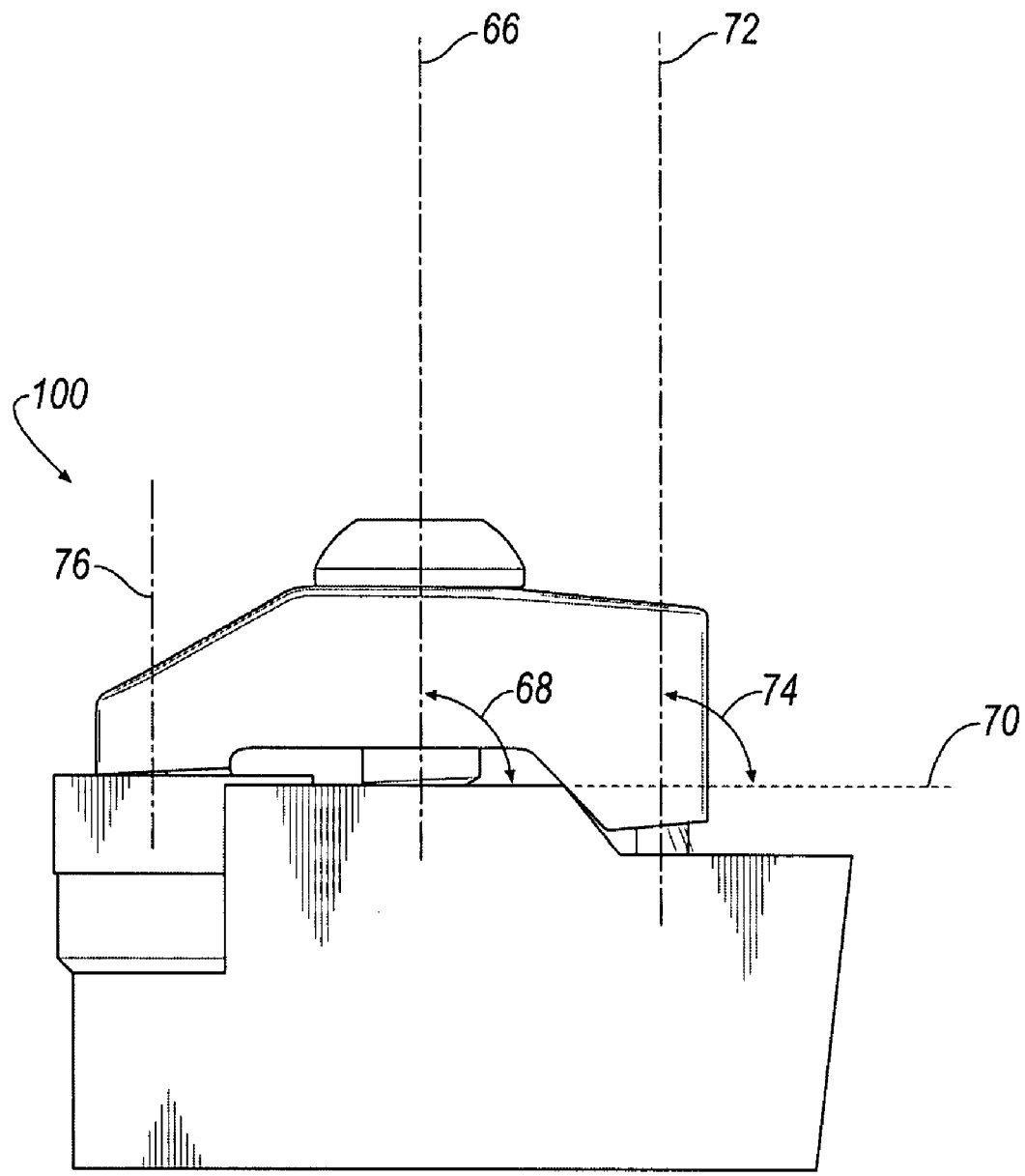
FIG. 12 is a side view of a clamping tool holder in which the central axis of the clamp-securing bore is substantially perpendicular to a plane of the tool holder body in accordance with an alternate embodiment of the invention.

Referring now to FIG. 12, a clamping tool holder 100 is shown according to another embodiment of the invention. In this embodiment, the central axis 66 of the clamp-securing bore 36 is substantially perpendicular to the plane 70 of the body 12, unlike the tool holder 10 in which the central axis 66 is not substantially perpendicular to the plane 70. Thus, the angle 68 is approximately 90 degrees in the tool holder 100, unlike the tool holder 10 in which the angle 68 is greater than 90 degrees. A resilient member such as a spring may be used for providing a biasing force to assist in lifting the clamp when the tool holder 10 is moved from the clamped position to the unclamped position.

In the illustrated embodiment, the central axis 72 of the pin-receiving bore 38 in the tool holder 100 is substantially parallel to the central axis 66 of the clamp-securing bore 36. In other words, the angle 74 is approximately equal to 90 degrees. As a result, the central axes 66, 72 of the clamp-securing bore 36 and the pin-receiving bore 38 do not intersect one another. However, in another embodiment, the angle 74 could be other than 90 degrees and the central axes 66, 72 could intersect one another.

The patents and publications referred to herein are hereby incorporated by reference.

Having described presently preferred embodiments the invention may be otherwise embodied within the scope of the appended claims.

What is claimed is:

1. A tool holder for releasably securing an insert, comprising:
   a tool holder body including an insert-receiving pocket formed at a forward end thereof and having a bottom and at least one side wall for receiving the insert, the tool holder body further including a clamp-securing bore having a central axis forming an angle with respect to a plane of the tool holder body;
   a clamp arranged on the tool holder body, the clamp including a top surface, a forward lower face and a rearward lower face, and an aperture formed therethrough, the clamp including a nose portion with a downward extending nub; and
   a clamp screw capable of being inserted through the aperture of the clamp and at least partially received in the clamp-securing bore of the tool holder body to bring the clamp into pressing engagement with the insert, the clamp screw including a head portion, a shoulder and a threaded portion; and
   a ring disposed about the shoulder of the clamp screw,
   wherein only the nub of the nose portion of the clamp engages a rearward inside surface of a mounting bore of the insert when the clamp is brought into pressing engagement with the insert, and
   wherein only the forward lower face of the nose portion engages a top surface of the insert when the clamp is brought into pressing engagement with the insert.

2. The tool holder according to claim 1, wherein the tool holder body includes an inclined surface having a prescribed angle with respect to the central axis of the clamp-securing bore, and wherein the clamp further includes an inclined surface formed at a different prescribed angle than the prescribed angle of the inclined surface of the tool holder body, thereby causing the clamp to pivot about a pivot point when the clamp is brought into pressing engagement with the insert.

3. The tool holder according to claim 1, wherein the tool holder body also includes a pin-receiving bore having a central axis formed at an angle with respect to the plane of the tool holder body.

4. The tool holder according to claim 3, wherein the central axis of the pin-receiving bore is substantially parallel to the central axis of the clamp-securing bore.

5. The tool holder according to claim 1, wherein the aperture of the clamp is oblong-shaped to allow movement of the clamp along its longitudinal axis.

6. The tool holder according to claim 1, wherein the head portion includes a lower face that forms an angle with respect to the top surface of the clamp when the clamp is brought into pressing engagement with the insert.

7. The tool holder according to claim 6, wherein only a forward end of the lower face engages the top surface of the clamp when the clamp is brought into pressing engagement with the insert.

8. The tool holder according to claim 1, further including a tapered spring disposed about the clamp screw.

9. The tool holder according to claim 1, wherein the angle formed by the central axis of the clamp-securing bore with respect to the plane of the tool holder body is approximately equal to ninety degrees.

10. The tool holder according to claim 1, wherein the angle formed by the central axis of the nub with respect to the plane of the tool holder body is approximately equal to ninety degrees.

11. A tool holder for releasably securing an insert, comprising:
   a tool holder body including an insert-receiving pocket formed at a forward end thereof, the tool holder body further including a clamp-securing bore having a central axis forming an angle with respect to a plane of the tool holder body, and a pin-receiving bore having a central axis formed at an angle with respect to the plane of the tool holder body;
   a clamp arranged on the tool holder body, the clamp including a top surface, a forward lower face and a rearward lower face, and an aperture formed therethrough, the clamp including a nose portion with a downward extending nub;
   a clamp screw capable of being inserted through the aperture of the clamp and at least partially received in the clamp-securing bore of the tool holder body to bring the clamp into pressing engagement with the insert, the clamp screw including a head portion having a lower face, a shoulder and a threaded portion; and a ring disposed about the shoulder of the clamp screw, wherein only the nub of the nose portion of the clamp engages a rearward inside surface of a mounting bore of the insert, and wherein only the forward lower face of the nose portion engages a top surface of the insert when the clamp is brought into pressing engagement with the insert, and wherein only a forward end of the lower face of the head portion of the clamp screw engages the top surface of the clamp when the clamp is brought into pressing engagement with the insert.

12. The tool holder according to claim 11, wherein the tool holder body includes an inclined surface having a prescribed angle with respect to the central axis of the clamp-securing bore, and wherein the clamp further includes an inclined surface formed at a different prescribed angle than the prescribed angle of the inclined surface of the tool holder body, thereby causing the clamp to pivot about a pivot point when the clamp is brought into pressing engagement with the insert.

13. The tool holder according to claim 11, wherein the central axis of the pin-receiving bore is substantially parallel to the central axis of the clamp-securing bore.

14. The tool holder according to claim 11, wherein the aperture of the clamp is oblong-shaped to allow movement of the clamp along its longitudinal axis.

15. The tool holder according to claim 11, wherein the angle formed by the central axis of the clamp-securing bore with respect to the plane of the tool holder body is approximately equal to ninety degrees.

16. The tool holder according to claim 11, wherein the angle formed by the central axis of the nub with respect to the plane of the tool holder body is approximately equal to ninety degrees.

17. The tool holder according to claim 11, further including a tapered spring disposed about the clamp screw.

18. A method of clamping an insert to a tool body, comprising the steps of:

providing a tool holder body including an insert-receiving pocket formed at a forward end thereof and having a bottom and at least one side wall for receiving the insert, the tool holder body further including a clamp-securing bore having a central axis forming an angle with respect to a plane of the tool holder body;

providing a clamp arranged on the tool holder body, the clamp including a top surface, a forward lower face and a rearward lower face, and an aperture formed therethrough, the clamp including a nose portion with a downward extending nub;

inserting a clamp screw into the aperture of the clamp and at least partially received in the clamp-securing bore of the tool holder body to bring the clamp into pressing engagement with the insert, the clamp screw including a head portion, a shoulder and a threaded portion; and disposing a ring about the shoulder of the clamp screw, whereby only the nub of the nose portion of the clamp engages a rearward inside surface of a mounting bore of the insert, and whereby only the forward lower face of the nose portion engages a top surface of the insert when the clamp is brought into pressing engagement with the insert.

* * * * *